United States Patent [19]

Iwaya et al.

[11] 4,404,029

[45] Sep. 13, 1983

[54] NON-LINEAR POLYCRYSTALLINE BARIUM TITANATE-TYPE DIELECTRIC ELEMENT

[75] Inventors: Shoichi Iwaya; Hitoshi Masumura, both of Akita; Yoshifumi Midori, Honjo; Yasunobu Oikawa; Hisao Abe, both of Akita, all of Japan

[73] Assignee: TDK Electronics Co., Ltd., Nihonbashi, Japan

[21] Appl. No.: 350,379

[22] Filed: Feb. 19, 1982

Related U.S. Application Data

[63] Continuation of Ser. No. 210,590, Nov. 26, 1980.

[30] Foreign Application Priority Data

Nov. 26, 1979 [JP] Japan ................................ 54-152573

[51] Int. Cl.³ ............................................ C04B 35/00
[52] U.S. Cl. .................................. 501/139; 252/62.9; 252/521; 501/10
[58] Field of Search ........................... 106/73.31, 39.8; 252/62.9, 521

[56] References Cited

U.S. PATENT DOCUMENTS 3,268,783  8/1966  Saburi ................................. 317/237

FOREIGN PATENT DOCUMENTS 1287995  4/1969  Fed. Rep. of Germany ... 106/73.31
933419   8/1963  United Kingdom ............. 106/73.31
47904    4/1979  U.S.S.R. .......................... 106/73.31

OTHER PUBLICATIONS

Japan J. Appln. Phys., vol. 16 (1977), No. 10, pp. 1871–1872.
Electrical Engineering, Oct. 1952, pp. 916–922.

Primary Examiner—John D. Welsh
Attorney, Agent, or Firm—Armstrong, Nikaido, Marmelstein & Kubovcik

[57] ABSTRACT

A D-E hysteresis loop of ferroelectrics known in the art has a square shape when the ferroelectrics are a $BaTiO_3$ single crystal. Such ferroelectrics are used as a non-linear dielectric element of, for example a pulse generating device. The non-linear dielectric element according to the present invention consists of a polycrystal mainly composed of $Ba(Ti_{0.90-0.98}Sn_{0.02-1.00})O_3$ and having an average grain diameter of from 10 to 60 $\mu$m. The non-linearity is excellent and the temperature dependence of the non-linearity is considerably low.

3 Claims, 9 Drawing Figures

No. 1

No. 2

No. 3

No. 4

NON-LINEAR POLYCRYSTALLINE BARIUM TITANATE-TYPE DIELECTRIC ELEMENT

This is a continuation, of application Ser. No. 210,590, filed Nov. 26, 1980.

The present invention relates to a non-linear dielectric element and, more particularly, a non-linear dielectric element which utilizes the non-linearity of a dielectric constant that depends on an electric field applied to a polycrystal composed of $BaTiO_3$.

$BaTiO_3$ is a typical ceramic of ferroelectrics having a perovskite structure. It is known to utilize the high dielectric constant and the piezoelectric property for electronic components. It is known that the $BaTiO_3$ single crystal property of the dielectric constant variance, depending upon the magnitude of the electric field, can be utilized in a non-linear type saturable element. Furthermore, it is known that the $BaTiO_3$ single crystal property of exhibiting a D-E hysteresis can be utilized in a memory storage element and a logic operational circuit element. It has been expected, due to the employment of the $BaTiO_3$ single crystal in the elements mentioned above, that the following advantages over the conventional polycrystalline $BaTiO_3$ are achieved. That is: the maximum usable frequency of the electric current in the elements is enhanced; the electric power consumption in the elements is considerably reduced, and; elements having a large capacity and a small size can easily be fabricated. Application research of the $BaTiO_3$ single crystal for the non-linear type saturable element and the like are published by Anderson et al of Bell Research Laboratory. However, recent researchers revealed that the $BaTiO_3$ single crystal is no longer commercially utilized for the non-linear type saturable type element and the like due to its disadvantages, such as a fatigue phenomenon and lack of threshold electric field.

A novel employment of the $BaTiO_3$ single crystal is disclosed in Japanese Published Patent Application No. 48-28726. The $BaTiO_3$ single crystal is used, according to this disclosure, as the non-linear saturable element in a contactless starting device of a fluorescent lamp, a mercury lamp, and discharge tubes, such as a sodium-vapor lamp.

However, the contactless starting device using the single crystal is disadvantageously expensive due to the cost of the single crystal, which is produced by a flux method or a fusing method.

In FIG. 1, the D (dielectric flux density)-E(electric field) hysteresis loop of a conventional $BaTiO_3$ (barium titanate) polycrystal is illustrated. As seen in FIG. 1, the D-E hysteresis loop of the conventional $BaTiO_3$ exhibits a certain saturation characteristic, but the slope of the D-E hysteresis loop is gradual. Accordingly, the conventional $BaTiO_3$ polycrystal is not used as the non-linear dielectric material. In addition, the dielectric constant of the conventional $BaTiO_3$ unstably varies in accordance with temperature, with the result that such $BaTiO_3$ exhibits an unstable non-linear property.

It is disclosed in Japanese Laid-Open Patent Application No. 52-146069 that the $ABO_3$ type ferroelectrics can be produced by blending such powder components as $PhO$, $ZrO_2$, $BaTiO_3$, $SrTiO_3$ and the like, and then, sintering the blended powders. Although a non-linear dielectric element having a polycrystalline structure can be produced by the disclosed process, the non-linearity of this element is not sufficient for the starting device mentioned above.

The required properties of the ferrodielectrics used for the non-linear dielectric element are: the gradient of D-E hysteresis loop should be steep; the D-E hysteresis loop should display a rectangular shape as shown in FIG. 2; the dielectric constant should be high, and the non-linear characteristic should be stable depending upon temperature. The $BaTiO_3$ single crystal exhibits a high dielectric constant and a rectangular D-E hysteresis loop, but disadvantageously has the low temperature-stability of the non-linear characteristic. The conventional $BaTiO_3$ polycrystal generally has the D-E hysteresis loops as shown in FIG. 1 and is not used for the non-linear dielectric element.

In Japanese Laid-Open Patent Application No. 52-146069, the surface of the non-linear element, having a thickness of about 200 $\mu$m, is subjected to a mirror finish or etching treatment, so as to obtain an excellent saturable curve of the D-E hysteresis loop. However, such treatment is complicated and the thin non-linear element does not possess a high mechanical strength or resistance against a pulse voltage generated in the starting device.

It is an object of the present invention to provide a polycrystalline non-linear dielectric element which exhibits an excellent non-linearity and a high breakdown voltage, and is capable of being produced by a simple process.

In accordance with the object of the present invention, there is provided a non-linear dielectric element consisting of a sintered polycrystal mainly composed of $Ba(Ti_{0.90-0.98}Sn_{0.02-0.10})O_3$ and having the average grain diameter in the range of from 10 to 60 $\mu$m.

The grain size of the present invention means the crystal grain size of the sintered product. The grain size of a $BaTiO_3$ type ceramic composition is mainly determined by replacing the amount of titanium (Ti) with tin (Sn), namely the mixing proportion of the $BaTiO_3$ component and the $BaSnO_3$ component. The grain size is however additionally controlled by a mineralizer additive, such as manganese carbonate ($MnCO_3$) and a clay material, as well as a trace amount of impurities, such as silicon oxide ($SiO_2$) and aluminum oxide ($Al_2O_3$). The average grain size in the range of from 10 to 60 82 m mentioned above can be obtained by from approximately 0.02 to 0.5% of the mineralizer additive and approximately up to 0.5 weight % of the impurities. The grain size can be determined by calculating the number of crystals per at least 1000 $\mu$m of an optional line drawn on the ceramic.

Other objects and features of the present invention are explained by referring to the drawings, wherein.

Figure 1:
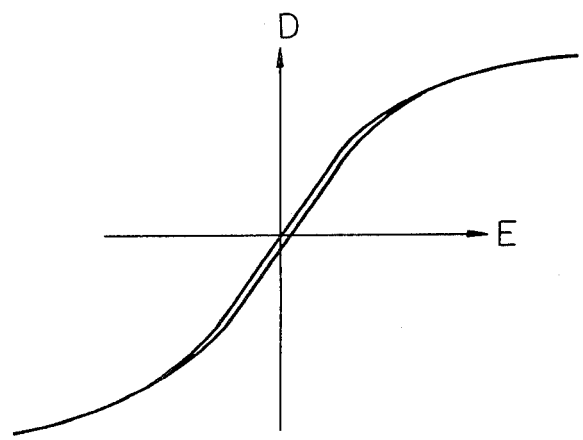
FIG. 1 illustrates a D-E hysteresis loop of a linear dielectric element.
Figure 2:
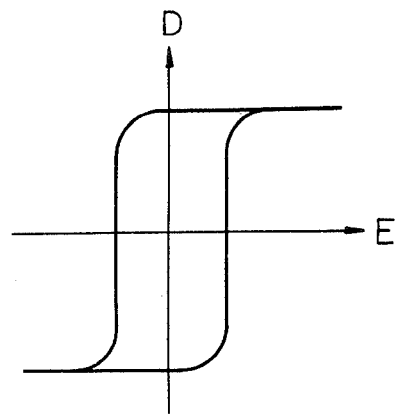
FIG. 2 illustrates a D-E hysteresis loop of a non-linear dielectric element.

The non-linearity mentioned above becomes prominent when the shape of the D-E hysteresis curve is changed from the shape as shown in FIG. 1 close to a square as shown in FIG. 2. In the D-E hysteresis curve which exhibits an almost square curve, the difference between the slopes of the hysteresis curve is large, and the non-linearity is provided. A specific embodiment of the non-linear dielectric element having the composition of $Ba(Ti_{0.94}Sn_{0.06})O_3$ and average grain diameter of 32 $\mu m$ exhibits the non-linear D-E hysteresis loop as illustrated in FIG. 3.

Figure 3:
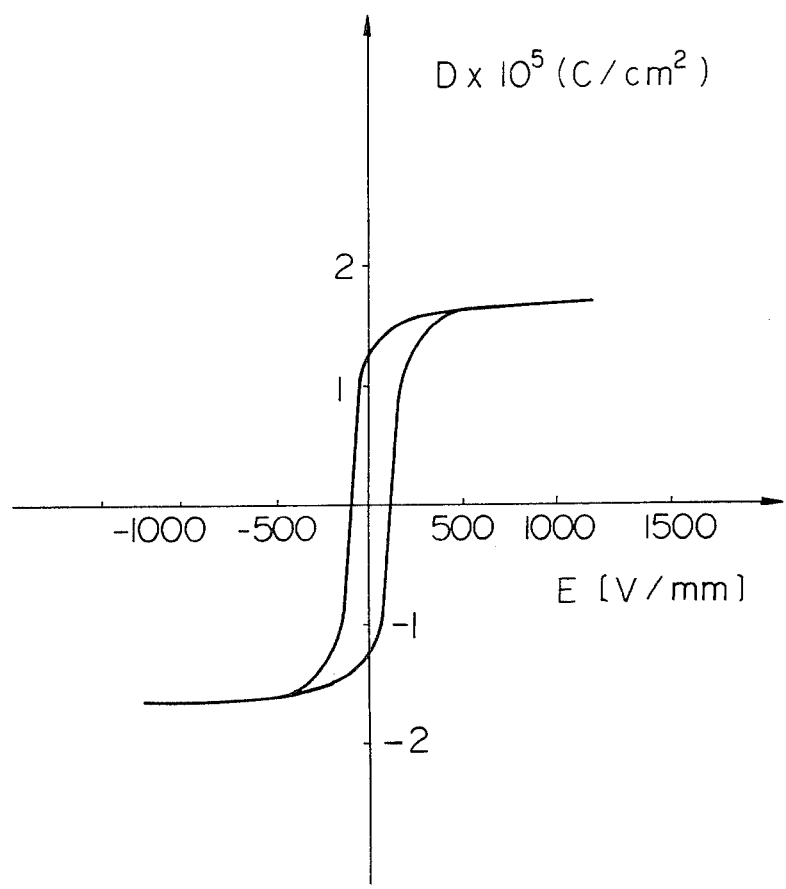
FIG. 3 illustrates the D-E hysteresis loop of an embodiment of the non-linear dielectric element according to the present invention.
Figure 4:
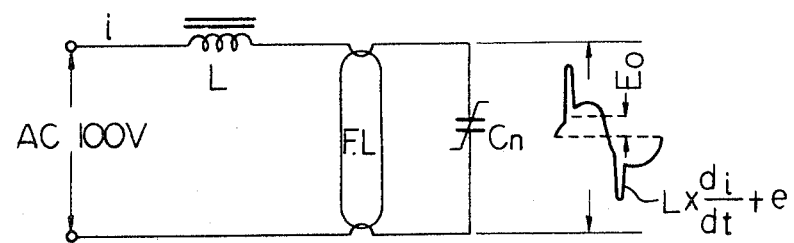
FIG. 4 illustrates an electric circuit for generating a pulse voltage comprising the non-linear dielectric element.

It is difficult to express quantitatively the non-linearity by illustrating shapes of the D-E hysteresis loop as in FIGS. 1 and 3. Accordingly, the pulse voltage is used hereinafter to quantitatively express the non-linearity of the $BaTiO_3$ polycrystals. Referring to FIG. 4, an alternating voltage of 100 V is applied through the stabilizer L to the non-linear dielectric element (Cn). The voltage measured at both ends of the non-linear dielectric element (Cn) includes the alternating voltage and the pulse voltage, which is overlapped on the alternating voltage of the Eo value. The pulse voltage is caused by a counter electromotive force, which is proportional to the inductance (Lo) of the stabilizer L, while the counter electromotive force is caused by the fact that the abrupt change of the charging current (di/dt) of the non-linear dielectric element (Cn) occurs at the voltage value of Eo. Such abrupt change results from the abrupt change in the slope of the non-linear D-E hysteresis loop. The mechanism that generates the pulse voltage is explained in detail with reference to FIG. 6.

Figure 6:
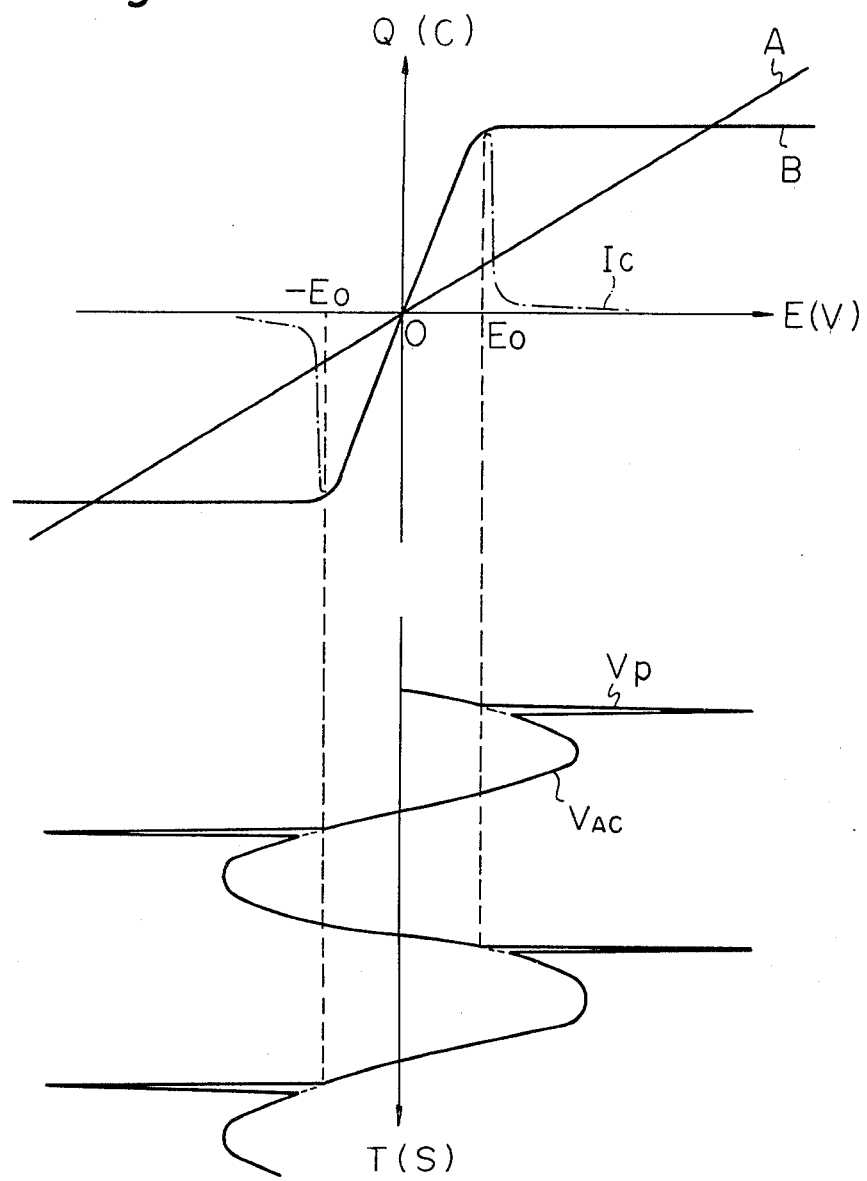
FIG. 6 illustrates the principle of operation of the non-linear dielectric element.

Referring to FIG. 6, the electric charge (Q) of the semilinear dielectric element is proportional to the electric field (E) as indicated by the line A. However, in the non-linear dielectric elements, the electric charge (Q) is constant when the electric field is more than Eo as seen by line B. Since there is a relationship of $Q(C)=C(F)\times V(V)$ between the electric charge (Q), the capacity (C) and voltage (V), the electric charge stored in the non-linear dielectric element is saturated at a voltage corresponding to or higher than the electric field of Eo or $-Eo$. As a result of the saturation of the stored electric change, the change of the charged current (Ic) is abruptly decreased as illustrated in the upper half of FIG. 6. Referring to the lower half of FIG. 6, the change of the alternating voltage ($V_{Ac}$) applied to the non-linear dielectric element (Cn) (FIG. 4) is apparent. When the alternating voltage ($V_{Ac}$) arrives at levels corresponding to the electric field of Eo and $-Eo$, the counter electromotive force, which is proportional to $L_0 \times (di/dt)$, and the pulse voltage Vp are generated in the stabilizer L. It will therefore be understood from the explanation in referring to FIGS. 4 and 6 that the pulse voltage (Vp) is proportional to the degree of non-linearity of the non-linear dielectric element, i.e. the degree of difference in the slopes of curve B at the electric field of Eo.

As a result of the investigation of the pulse voltage of various $BaTiO_3$ type ceramic compositions, the present inventors discovered that the $BaTiO_3$ type polycrystal is provided with the desirable D-E hysteresis loop, as illustrated in FIG. 2, a high breakdown voltage and a high temperature-stability of non-linearity by adjusting the average grain diameter from 10 to 60 microns, preferably from 16 to 40 microns and also by replacing titanium (Ti) with tin (Sn) in a molar percentage of from 2 to 10%, preferably from 4 to 6% based on the total of titanium and tin.

In an embodiment of the present invention, the non-linear dielectric element comprises a minor but effective amount of a mineralizer additive, which is at least one selected from the group consisting of a clay material, manganese oxide and a compound of rare earth element. The mineralizer additive prevents the reduction of the ceramic composition and promotes a densification phenomenon during sintering. The maximum amount of the mineralizer additive to 0.5%, preferably 0.3% by weight based on 100% by weight of the ceramic composition.

In a further embodiment of the present invention, a non-linear dielectric element having the composition mentioned above is used in a pulse generating device, a contactless starting device of lamps, a memory storage element, a logic operational circuit element, a switching element of high voltage source and a generating circuit of a high trigger voltage. Since the non-linear dielectric element according to the present invention exhibits a high dielectric constant, and an extremely stable temperature dependence of non-linearity as compared with that of the $BaTiO_3$ single crystal, the non-linear dielectric element can practically be employed for the devices and elements mentioned above.

Figure 5:
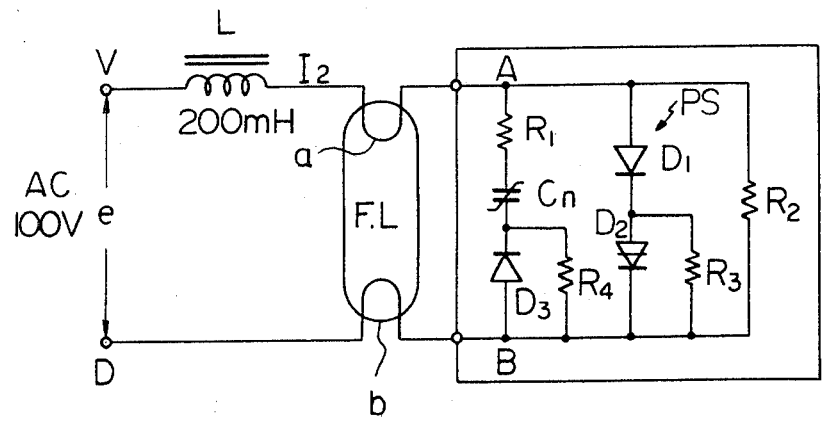
FIG. 5 illustrates an electric circuit for lighting a fluorescent lamp.

In FIG. 5, an electric circuit of a lighting device of a fluorescent lamp is shown. A source voltage (AC. 100 V) is applied to the terminals of a fluorescent lamp (FL) via a stabilizer (L). A pulse generating circuit (between A and B), and a preheating circuit (PS) are connected in parallel to both filaments of the fluorescent lamp (FL). The pulse generating circuit comprises a resistance ($R_1$), the non-linear dielectric element (Cn), and a semiconductor diode switch ($D_3$), which are connected in series. The preheating circuit (PS) comprises a semiconductor diode switch ($D_1$) and a unilateral breakover semiconductor switch ($D_2$) such as a PNPN switch, which are connected in series to one of the terminals of the pulse generating circuit. $R_1$, $R_2$, $R_3$ and $R_4$ denote resister elements.

The electric circuit illustrated in FIG. 5 is an application of an electric circuit illustrated in FIG. 4 to the lighting device of fluorescent lamp. The lighting devive of a fluorescent lamp comprises as basic elements the non-linear dielectric element (Cn), which is connected in series with the fluorescent lamp (FL), and the preheating circuit, and may be varied from that illustrated in FIG. 5.

The electric circuit illustrated in FIG. 5 functions as follows. The voltage, having a value almost the same as the source voltage, is applied to the terminals of the resistor ($R_2$), at a positive rising quarter cycle of the sine wave of the alternating current. This applied voltage is applied, almost simultaneously with the application to the resistor ($R_2$), to the unilateral breakover semiconductor switch ($D_2$).

When the voltage applied to the switch (D₂) reaches the breakover voltage thereof, the switch (D₂) turns on and then the current is conducted through the stabilizer (L), one of the filaments (a) of fluorescent lamp (FL), the semiconductor diode switch (D₁) and the other filament (b). These filaments (a and b) are therefore preheated. When the preheating current is decreased to a level lower than the holding current of the semiconductor diode switch (D₂), the alternating current, the semiconductor diode switch (D₂) turns off. Due to the inductive load of the stabilizer L, the phase of the alternating current is delayed from the phase of the voltage. Therefore, when the semiconductor diode switch (D₂) turns off, the voltage enters the positive cycle, with the result that the non-linear dielectric element (Cn) is abruptly charged by the voltage between the point A, at which the voltage is in a negative cycle, and the point B, at which the voltage is in a positive cycle. Shortly after the charging of the non-linear dielectric element is started, the stored electric charges in the non-linear dielectric element are saturated and the charging current Ic (FIG. 6) is steeply decreased to a level such as illustrated in FIG. 6. As a result, a counter electromotive force and pulse voltage are generated. When the filaments of the fluorescent lamp (FL) are completely preheated, the fluorescent lamp is triggered or lighted by the pulse voltage. The trigger voltage, which actuates or lights the fluorescent lamp, is proportional to the value of L×di/dt. A large di/dt is necessary for a high trigger voltage. Since the pulse voltage generated by the non-linear dielectric element according to the present invention is generally high, commercially available fluorescent lamp can be reliably lighted. It is be noted that the pulse voltage can be from 500 to 950 V and is sufficiently high for lighting the fluorescent lamps at an ambient temperature of from −30° C. to 60° C.

The present invention will now be explained in further detail by way of examples.

EXAMPLE 1

Starting powder materials in the form of $BaCO_3$, $TiO_2$ and $SnO_2$ were mixed so as to obtain mixture compositions consisting of ingredients as shown in Table 1, below. Mineralizers in the form of $MnCO_3$ and clay in an amount of 0.1 parts by weight were added to 100 parts of the mixture compositions. These starting materials are the minearlizers were mixed by means of a wet process using a porcelain pot and, then, an agate bowl. The mixtures were dried to remove the water and, then, presintered at 1150° C. for a period of 2 hours. The presintered mixtures were crushed and mixed by means of a wet process using the porcelain pot and the agate bowl. After vaporizing the water from the mixtures, an adequate amount of binder was added to the mixtures, which were then shaped under pressure, using a 10 ton press, into discs having a diameter of 16.5 mm and a thickness of 0.45 mm. The discs were subjected to a final sintering at 1400° to 1500° C. for 2 hours, to thereby obtain non-linear dielectric elements. The dielectric constant ($\epsilon_s$), the dielectric loss at 1 kHz (tan δ), the insulation resistance (IR) and the breakdown voltage of these non-linear dielectric elements were measured.

The surface of the non-linear dielectric elements was observed at a magnification of 400 and the average grain diameter thereof was determined from the count of the number of crystals per unit length. The grain diameter observed at the interior of these elements was the same as that observed at the surface.

Figure 9:
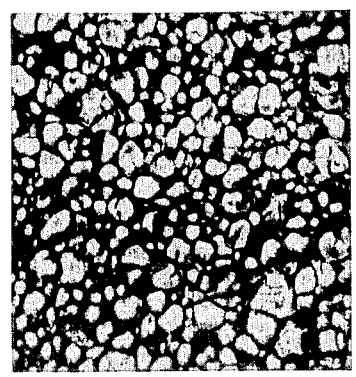
FIG. 9 is microphotographs of the surface on four specimens of the sintered non-linear dielectric compositions.
Figure 9:
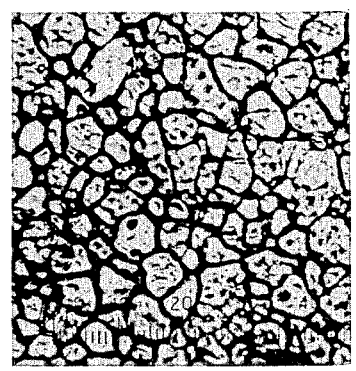
Figure 9:
Figure 9:

Microphotographs of Sample Nos. 8, 9, 4 and 13 are shown in FIG. 9 as Nos. 1, 2, 3 and 4, respectively. A silver electrode was baked at both surfaces of the dielectric elements, which were connected, as a non-linear dielectric element (Cn), in a lighting device as shown in FIG. 5. The pulse voltage was measured in the electric circuit of FIG. 5. The measuring results are shown in Table 1.

TABLE 1

| Sample No. | Proportion of Ingredients mol % | | Average Grain Diameter (μm) | Electric Properties | | | | |
|---|---|---|---|---|---|---|---|---|
| | $BaTiO_3$ | $BnSnO_3$ | | $\epsilon_s$ | tan δ (%) | IR (MΩ) | Pulse Voltage (V) | Breakdown Voltage (kV) |
| 1 | 100 | 0 | 38 | 1800 | 3.5 | 4 × 10⁴ | 300 | 2.5 |
| 2 | 98 | 2 | 45 | 3000 | 4.6 | 4 × 10⁴ | 700 | 3.5 |
| 3 | 96 | 4 | 16 | 2300 | 4.2 | 5 × 10⁴ | 950 | 4.0 |
| 4 | 94 | 6 | 32 | 2500 | 3.2 | 4 × 10⁴ | 940 | 3.8 |
| 5 | 92 | 8 | 20 | 5200 | 4.0 | 4 × 10⁴ | 700 | 3.8 |
| 6 | 90 | 10 | 40 | 7300 | 3.9 | 4 × 10⁴ | 700 | 2.5 |
| 7 | 84 | 16 | 50 | 9500 | 0.5 | 3 × 10⁴ | 230 | 3.2 |
| 8 | 96 | 4 | 7 | 4900 | 9.0 | 10 × 10⁴ | 350 | 5.2 |
| 9 | 96 | 4 | 10 | 4800 | 7.3 | 8 × 10⁴ | 770 | 4.7 |
| 10 | 96 | 4 | 17 | 4500 | 4.7 | 5 × 10⁴ | 900 | 3.8 |
| 11 | 96 | 4 | 32 | 4100 | 3.6 | 5 × 10⁴ | 950 | 3.2 |
| 12 | 96 | 4 | 60 | 3800 | 2.4 | 2 × 10⁴ | 890 | 2.1 |
| 13 | 96 | 4 | 103 | 3200 | 1.3 | 1 × 10⁴ | 850 | 0.9 |

In Table 1, above, the sample numbers appearing within circles indicate samples with an average grain diameter or composition falling outside those of the present invention. The pulse voltage of the samples of the present invention is 700 volt at the lowest and 950 volt at the highest.

Figure 7:
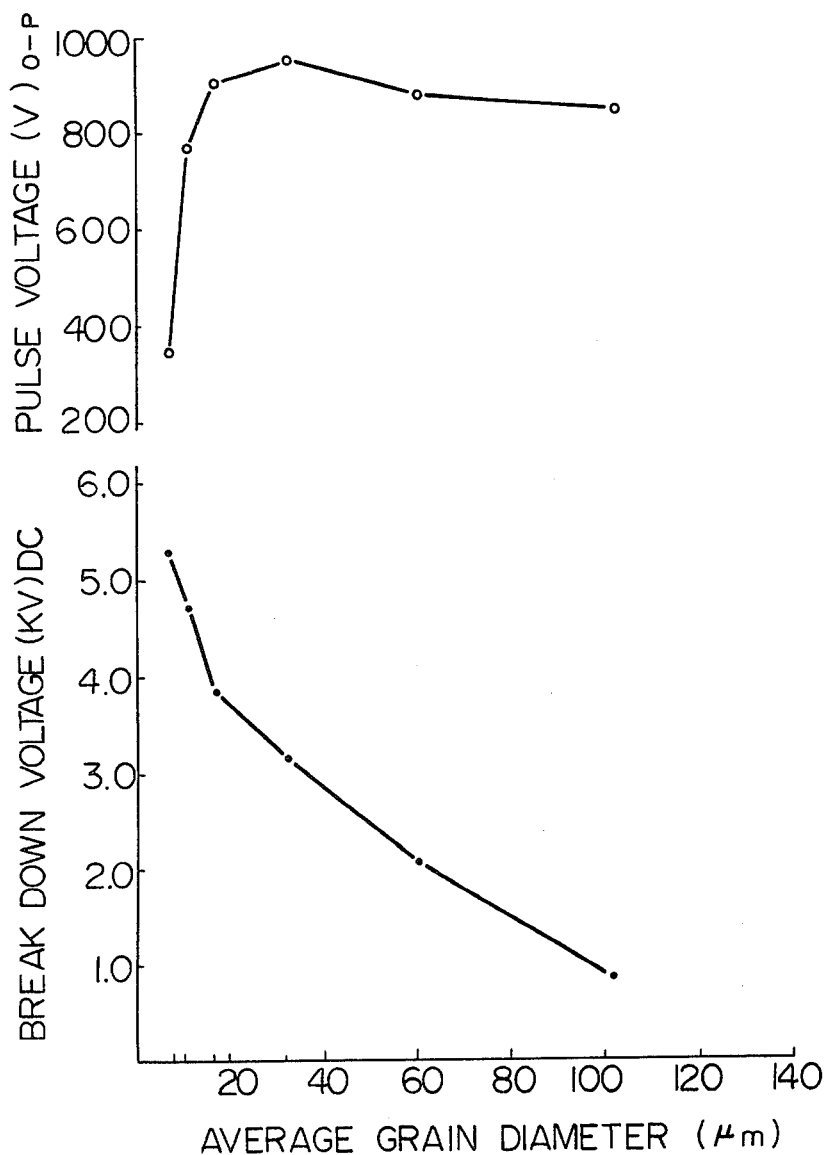
FIG. 7 is a graph indicating the relationship of the pulse voltage and breakdown voltage versus the average grain diameter of sintered polycrystalline non-linear dielectric compositions.

The pulse voltage and breakdown voltage of the samples in Table 1 are graphically illustrated in FIG. 7 versus the average grain diameter. As is apparent from FIG. 7, the pulse voltage displays a remarkable increase with the increase of the average grain diameter of up to 30 μm and the breakdown voltage displays a gradual decrease with the increase of average grain diameter. The average grain diameter in the range of from 10 to 60 μm preferably from 16 to 40 μm, is preferable in the light of a high pulse voltage and a high breakdown voltage.

EXAMPLE 2

Figure 8:
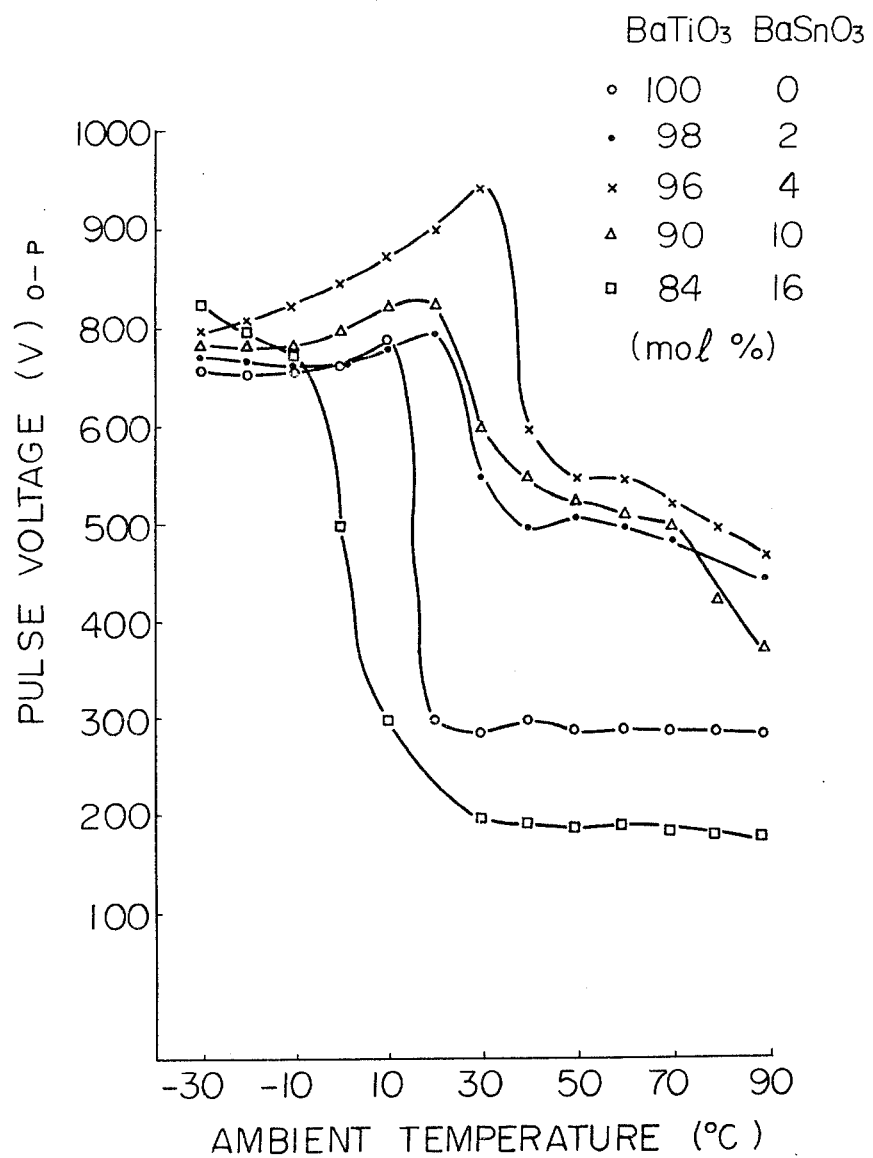
FIG. 8 is a graph indicating the relationships between the ambient temperature and pulse voltages generated by the sintered non-linear dielectric compositions having a formula of $Ba(Ti_xSn_{1-x})O_3$.

Five ceramic compositions, corresponding to Nos. 1, 2, 3, 6 and 7 in Table 1 and indicated in FIG. 8 with their symbols, were prepared by the same procedure as explained in Example 1. The pulse voltages were measured at a temperature of from −30° to 90° C. The pulse voltage change versus the temperature is illustrated in FIG. 8 as is apparent from FIG. 8, such change is considerably large at 0% and 16% of the BaSnO$_3$ component.

We claim:

1. A non-linear dielectric element which utilizes the non-linearity of a dielectric constant that depends on an electric field consisting of a sintered polycrystal mainly composed of Ba(Ti$_{0.90-9.98}$Sn$_{0.02-0.10}$)O$_3$ and having an average grain diameter in the range of from 10 to $a$ $\mu$m.

2. A non-linear dielectric element according to claim 1, wherein said average grain diameter is in the range of from 16 to 40 $\mu$m.

3. A non-linear dielectric element according to claim 1, wherein said element comprises a minor but effective amount of a mineralizer additive, which is at least one selected from the group consisting of a clay material, manganese oxide and a compound of a rare earth element.

* * * * *